(12) United States Patent
Yoshida et al.

(10) Patent No.: US 8,058,849 B2
(45) Date of Patent: Nov. 15, 2011

(54) VEHICLE DRIVE MECHANISM (75) Inventors: Tadafumi Yoshida, Nisshin (JP); Yutaka Hotta, Chiryu (JP)

(73) Assignees: Toyota Jidosha Kabushiki Kaisha, Aichi-ken (JP); Aisin AW Co., Ltd., Aichi-ken (JP)

( * ) Notice: Subject to any disclaimer, the term of this patent is extended or adjusted under 35 U.S.C. 154(b) by 257 days.

(21) Appl. No.: 12/304,695

(22) PCT Filed: Jun. 7, 2007

(86) PCT No.: PCT/JP2007/061960
§ 371 (c)(1),
(2), (4) Date: Dec. 12, 2008

(87) PCT Pub. No.: WO2007/145266
PCT Pub. Date: Dec. 21, 2007

(65) Prior Publication Data
US 2009/0250272 A1 Oct. 8, 2009

(30) Foreign Application Priority Data
Jun. 13, 2006 (JP) ................................. 2006-163785

(51) Int. Cl.
*H20P 3/00* (2006.01)

(52) U.S. Cl. ................. 322/13; 322/17; 322/16; 322/14

(58) Field of Classification Search ...................... 322/13
See application file for complete search history.

(56) References Cited

U.S. PATENT DOCUMENTS

| 5,939,848 | A | * | 8/1999 | Yano et al. ..................... 318/139 |
| 6,166,498 | A | | 12/2000 | Yamaguchi et al. |
| 6,356,042 | B1 | * | 3/2002 | Kahlon et al. ............. 318/400.1 |
| 6,612,386 | B2 | * | 9/2003 | Tamai et al. ............... 180/65.25 |
| 7,255,186 | B2 | * | 8/2007 | Wakuta et al. ............. 180/65.21 |
| 2004/0084233 | A1 | | 5/2004 | Wakuta et al. |
| 2005/0211490 | A1 | | 9/2005 | Shimizu et al. |
| 2005/0237033 | A1 | | 10/2005 | Shirakawa et al. |

FOREIGN PATENT DOCUMENTS

| JP | 9-260196 A | 10/1997 |
| JP | 11-340073 A | 12/1999 |
| JP | 2000-217205 A | 8/2000 |
| JP | 2001-119898 A | 4/2001 |
| JP | 2001-354040 A | 12/2001 |
| JP | 2002-326562 A | 11/2002 |
| JP | 2004-66898 A | 3/2004 |
| JP | 2004-297846 A | 10/2004 |
| JP | 2005-253167 A | 9/2005 |
| JP | 2005-328690 A | 11/2005 |
| JP | 2007-99121 A | 4/2007 |
| JP | 2007-106256 A | 4/2007 |
| JP | 2007-223468 A | 9/2007 |

* cited by examiner

*Primary Examiner* — Tulsidas C Patel
*Assistant Examiner* — Iraj A Mohandesi
(74) *Attorney, Agent, or Firm* — Sughrue Mion, PLLC (57) ABSTRACT

A vehicle drive mechanism includes a power transmission mechanism which has a rotary electric motor and a gear mechanism for transmitting mechanical power from the rotary electric motor to a drive shaft disposed coaxially with an output shaft of the rotary electric motor, and a control unit formed of a plurality of elements and controlling an operation of the rotary electric motor. At least one of the elements which constitute the control unit is disposed on a periphery of at least one of the rotary electric motor, the drive shaft, and the gear mechanism.

6 Claims, 8 Drawing Sheets

VEHICLE DRIVE MECHANISM

TECHNICAL FIELD

The present invention relates to a vehicle drive mechanism of a hybrid vehicle, including a power transmission mechanism that has a rotary electric motor and a gear mechanism for transmitting mechanical power from the rotary electric motor, and a power control unit for controlling a driven state of the power transmission mechanism.

BACKGROUND ART

Recently, attention has been focused on a Hybrid Vehicle as an environment-friendly motor vehicle. Hybrid vehicles are identified as a motor vehicle that uses a power transmission mechanism driven by a direct-current power supply via an inverter in a power control unit, as well as the conventional engine, as mechanical power sources. Stated differently, a hybrid vehicle obtains a mechanical power source by driving the engine, and additionally, obtains a mechanical power source by converting a direct-current voltage from the direct-current power supply into an alternating-current voltage by means of the inverter, and using the alternating-current voltage obtained by conversion to rotate a motor in the power transmission mechanism.

The power transmission mechanism splits a power output from the engine at a gear mechanism such as a planetary gear, for providing the same to a rotary electric motor for control and an output side for running, controls the rotary electric motor for control such that it mainly serves as a generator to steplessly control output torque of the planetary gear described above, and furthermore, combines torque of another electrical motor for driving (assisting) with the output torque of the planetary gear described above, as needed, to output the same to the output shaft. For example, Japanese Patent Laying-Open No. 2004-66898 describes a vehicle drive mechanism of an FR hybrid vehicle. A power control unit that includes an inverter, a converter, a reactor, and a capacitor is generally accommodated in a PCU casing, and disposed in an engine room.

In recent years, as described in Japanese Patent Laying-Open No. 2004-297846, there has been proposed a vehicle drive mechanism in which a plurality of coolers are disposed radially by setting a motor shaft or a driving shaft as the center, and allowing cooling surfaces of the coolers to be parallel with the drive shaft or the driving shaft, and one or both of the cooling surfaces of each of the coolers is equipped with a semiconductor module for supplying electric power to a rotary electric motor, so that a power transmission mechanism and a power control unit are integrated without causing excessive increase in size.

Generally, in the power transmission mechanism, a radius of a gear mechanism such as a planetary gear measured from the drive shaft, and a radius of a rotary electric motor measured from the drive shaft are not the same, and different from each other. Therefore, a space identified as a dead space is left in an enclosure of the power transmission mechanism, on an outer peripheral side of the planetary gear and an outer peripheral side of the rotary electric motor. In the conventional vehicle drive mechanism described above, effective use of a space in the power transmission mechanism has not yet been achieved sufficiently.

In contrast, the PCU casing disposed in the engine room accommodates various electrical apparatuses such as a capacitor, a boost inverter, and a converter. The PCU casing has a large volume, and hence a ratio at which the PCU casing occupies the engine room is high.

The vehicle drive mechanism, which is described in Japanese Patent Laying-Open No. 2004-297846 described above, does not aim to effectively utilize a dead space in the power transmission mechanism, and merely modifies the positions of the semiconductor modules, which have been accommodated in the PCU casing. Therefore, the vehicle drive mechanism having the semiconductor module and the power transmission mechanism integrated therein has increased in volume, and disadvantageously, a volume of the engine room is even more decreased accordingly.

DISCLOSURE OF THE INVENTION

The present invention has been made in view of the above-described problems, and an object of the present invention is to dispose at least a part of elements that form the power control unit in a dead space in the power transmission mechanism to thereby effectively use the dead space in the power transmission mechanism, downsize the PCU casing, and effectively utilize a space in the engine room.

A vehicle drive mechanism according to the present invention includes: a power transmission mechanism which has a rotary electric motor, and a gear mechanism for transmitting mechanical power from the rotary electric motor to a drive shaft disposed coaxially with an output shaft of the rotary electric motor; and a control unit formed of a plurality of elements and controlling an operation of the rotary electric motor. At least one of the elements which constitute the control unit is disposed on a periphery of at least one of the rotary electric motor, the drive shaft, and the gear mechanism.

Preferably, at least a part of the elements which form the control unit is provided on an outer periphery of one of the gear mechanism and the rotary electric motor, a radius of the one of the gear mechanism and the rotary electric motor measured from the drive shaft being smaller than a radius of the other of the gear mechanism and the rotary electric motor measured from the drive shaft. Preferably, the elements which form the control unit are disposed along a virtual circle concentric with the drive shaft.

Preferably, the elements which form the control unit include a capacitor. Preferably, the vehicle drive mechanism includes a plurality of the rotary electric motors. The gear mechanism which has a radius smaller than a radius of at least one of the rotary electric motors is disposed between the rotary electric motors, and the capacitor is disposed on an outer peripheral side of the gear mechanism.

Preferably, the capacitor has a plurality of cells. Each of the cells has an inner peripheral surface and an outer peripheral surface. A length of the outer peripheral surface in a circumferential direction of the drive shaft is made larger than a length of the inner peripheral surface in the circumferential direction of the drive shaft.

Preferably, the vehicle drive mechanism further includes an enclosure for accommodating the power transmission mechanism. The elements which form the control unit include an inverter, and the inverter is provided in the enclosure. Preferably, the inverter is provided on an underside of the power transmission mechanism. Preferably, the power transmission mechanism drives a rear wheel.

With the vehicle drive mechanism according to the present invention, it is possible to effectively use the dead space in the power transmission mechanism and downsize the PCU casing, to effectively utilize a space in the engine room.

It is noted that two or more of the above-described configurations may also be combined as appropriate.

BEST MODES FOR CARRYING OUT THE INVENTION

Figure 1:
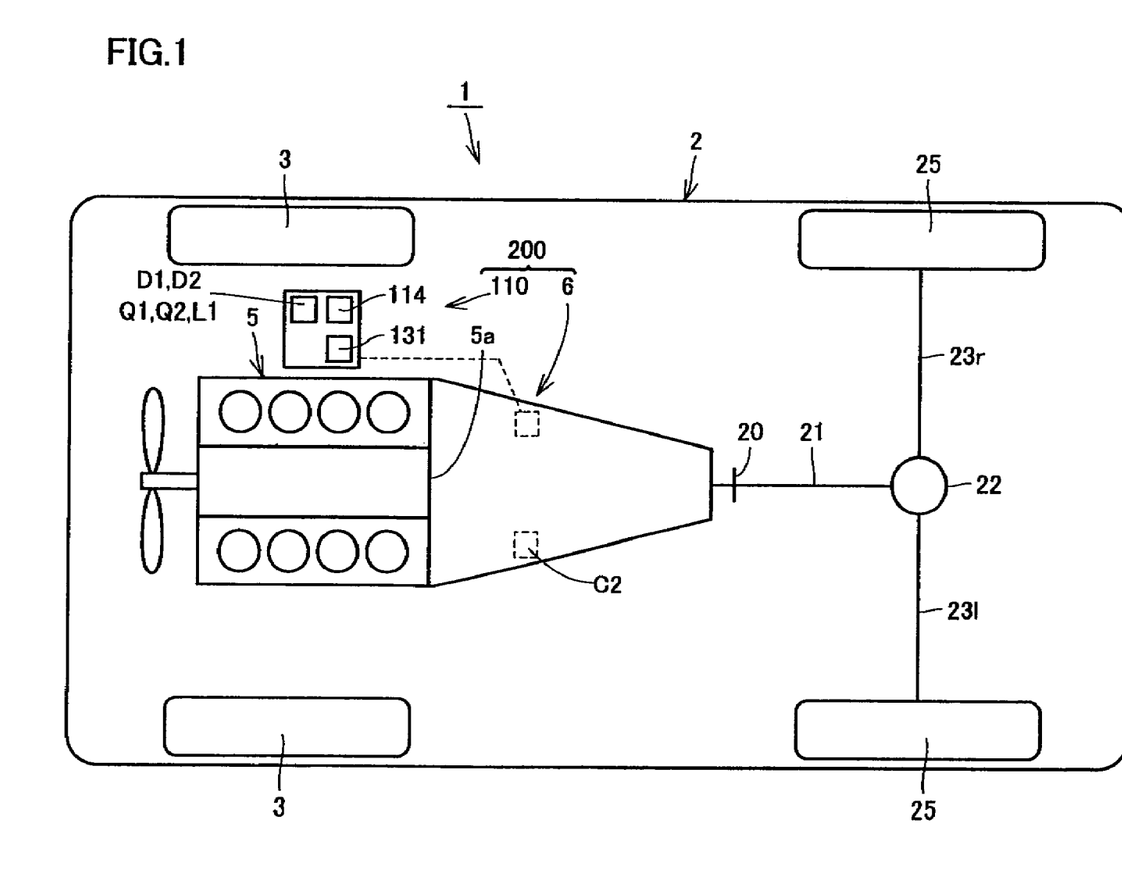
FIG. 1 is a plan view that schematically shows a hybrid vehicle including a vehicle drive mechanism according to the present invention.

An embodiment of the present invention will hereinafter be described with reference to the drawings. FIG. 1 is a plan view that schematically shows a hybrid vehicle 1 including a vehicle drive mechanism 200 according to the present invention. Vehicle drive mechanism 200 is for an FR motor vehicle mounted with a hybrid drive device (power transmission mechanism) 6 that includes a rotary electric motor, a planetary gear, and the like, and a semiconductor module (power control unit) 110. Hybrid vehicle 1 is suspended on right and left front wheels 3, 3 and right and left rear wheels 25, 25. On a front portion of a body 2 of the vehicle, an internal combustion engine 5 is mounted with a rubber mount interposed therebetween, with its crankshaft disposed along a front-back direction.

Figure 2:
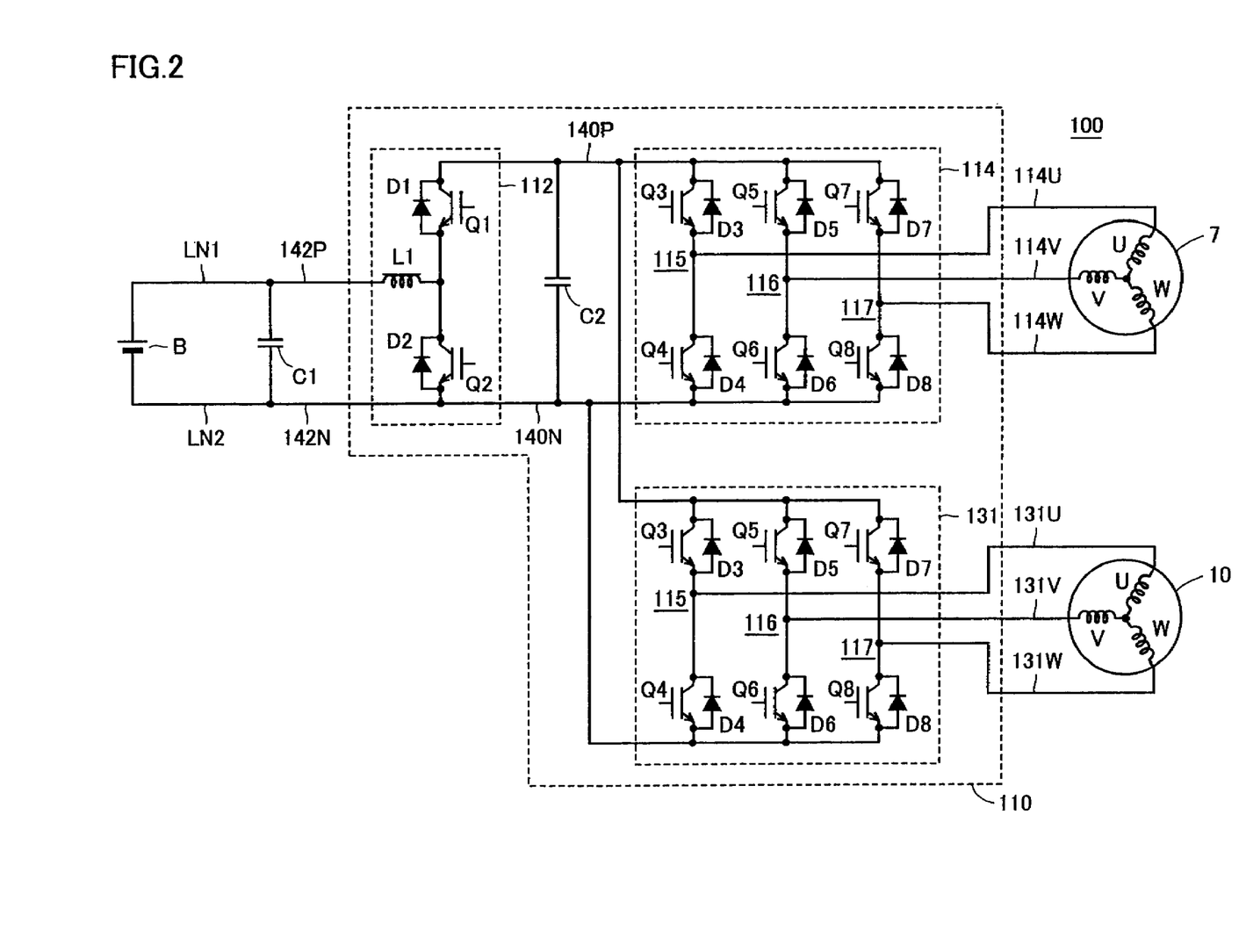
FIG. 2 is a circuit diagram of a motor drive device mounted with a semiconductor module (control unit).

FIG. 2 is a circuit diagram of a motor drive device 100 mounted with semiconductor module (control unit) 110. As shown in FIG. 2, motor drive device 100 includes a battery B, a capacitor C1, and semiconductor module 110.

Semiconductor module 110 includes inverters 114, 131, a boost converter 112, and a capacitor C2.

Each of an electrical motor 7 for control and an electrical motor 10 for driving is a three-phase alternating-current rotating electrical machine. Each of electrical motor 7 for control and electrical motor 10 for driving may function as a power generator and an electric motor. However, electrical motor 7 for control mainly operates as a power generator, while electrical motor 10 for driving mainly operates as an electric motor.

Boost converter 112 includes a reactor L1, switching elements Q1, Q2, and diodes D1, D2. Reactor L1 has one end connected to a power supply line LN1 of battery B, and the other end connected to a midpoint between switching element Q1 and switching element Q2, namely, connected between an emitter of switching element Q1 and a collector of switching element Q2. Switching elements Q1, Q2 are connected in series between power supply line LN1 and an earth line LN2.

A collector of switching element Q1 is connected to power supply line LN1, while an emitter of switching element Q2 is connected to earth line LN2. Diodes D1, D2 are connected between the collector and the emitter of switching elements Q1, Q2, respectively, for allowing a current to flow from the emitter side to the collector side.

Inverter 114 is formed of a U-phase arm 115, a V-phase arm 116, and a W-phase arm 117. U-phase arm 115, V-phase arm 116, and W-phase arm 117 are provided in parallel between power supply line LN1 and earth line LN2.

U-phase arm 115 is formed of switching elements Q3, Q4 connected in series. V-phase arm 116 is formed of switching elements Q5, Q6 connected in series. W-phase arm 117 is formed of switching elements Q7, Q8 connected in series. Diodes D3-D8 are connected between the collector and the emitter of switching elements Q3-Q8, respectively, for allowing a current to flow from the emitter side to the collector side.

Midpoints of U, V and W-phase arms are connected to U, V and W-phase ends of U, V and W-phase coils of electrical motor 7 for control, respectively. Specifically, electrical motor 7 for control is constituted such that three U, V and W-phase coils have one ends all connected to a neutral point, and the U-phase coil has the other end connected to a midpoint between switching elements Q3, Q4, the V-phase coil has the other end connected to a midpoint between switching elements Q5, Q6, and the W-phase coil has the other end connected to a midpoint between switching elements Q7, Q8.

Inverter 131 has a configuration similar to the configuration of inverter 114. It is noted that a MOS transistor, for example, is applied to serve as each of switching elements Q1-Q8 included in boost converter 112 and inverters 114, 131.

Battery B is a high-voltage battery constituted by multiple secondary battery cells, such as nickel-hydrogen batteries and lithium-ion batteries, connected in series. It is noted that battery B may also be constituted by a condenser, a capacitor, a fuel cell, or the like, other than these secondary batteries.

Capacitor C1 smoothes a direct-current voltage supplied from battery B, and supplies the smoothed direct-current voltage to boost converter 112.

In the above-described configuration, inverters 114, 131 and boost converter 112 are integrated to constitute semiconductor module 110. Inverters 114, 131 and switching elements Q1, Q2, diodes D1, D2, and reactor L1 are disposed in a PCU casing 60 disposed in an engine room.

Figure 3:
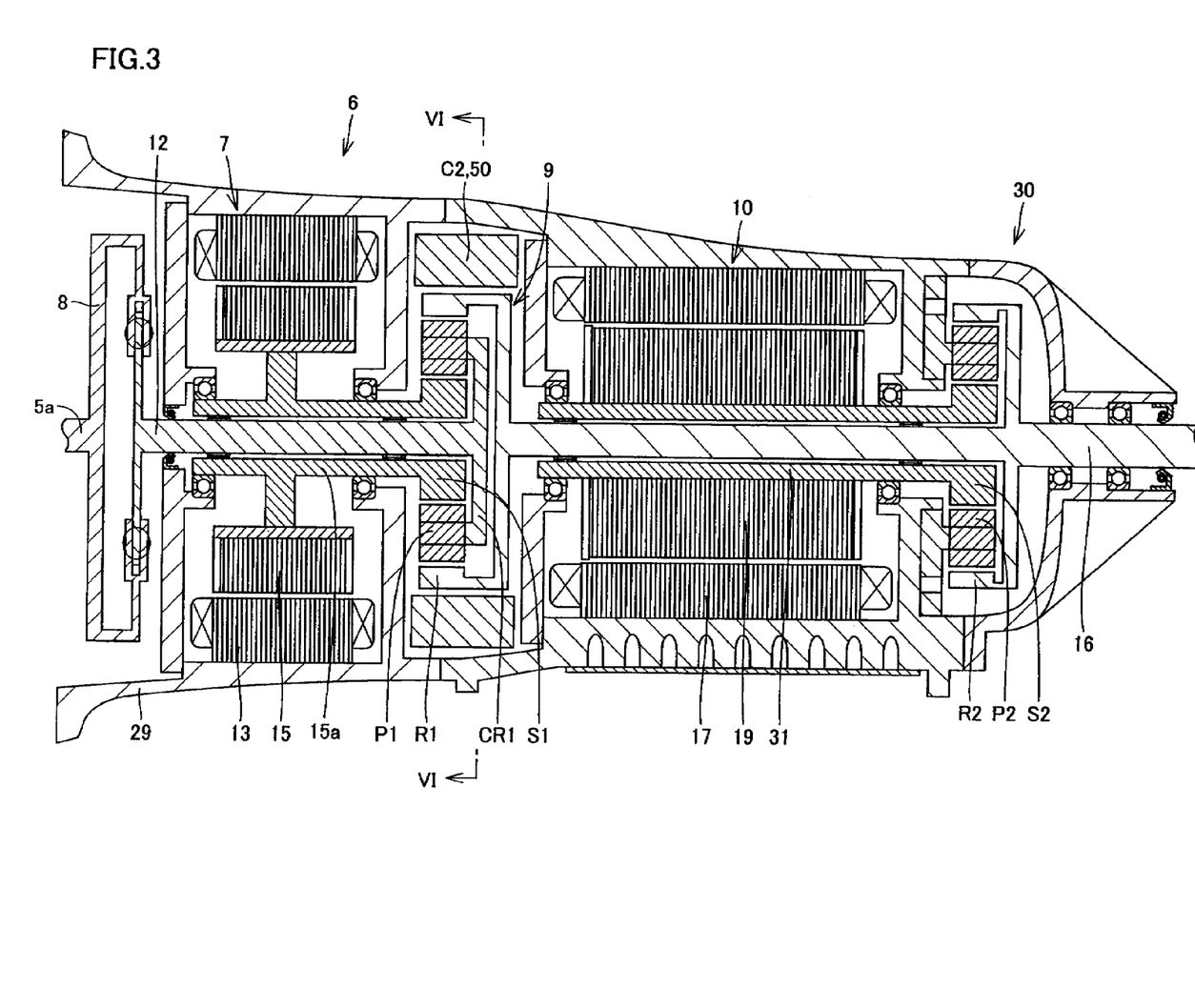
FIG. 3 is a cross-sectional view of a hybrid drive device.

FIG. 3 is a cross-sectional view of hybrid drive device 6. As shown in FIG. 3, hybrid drive device 6 has electrical motor for control (first rotary electric motor) 7, a mechanical-power-splitting planetary gear (first gear mechanism) 9, and electrical motor for driving (second rotary electric motor) 10, which are successively disposed on an axis aligned with a crankshaft, from a side of internal combustion engine 5. In addition, a transmission 30 such as an automatic transmission is provided on a rear side of electrical motor 10 for driving.

Hybrid drive device 6 is accommodated in a casing (enclosure) 29 constituted by a plurality of casing portions integrally assembled.

Casing 29 is fixed to internal combustion engine 5, and includes an accommodation chamber for accommodating electrical motor 7 for control, an accommodation chamber for accommodating mechanical-power-splitting planetary gear 9, an accommodation chamber for accommodating electrical motor 10 for driving, and an accommodation chamber for accommodating transmission 30.

An input shaft 12 of hybrid drive device 6 is coupled to an output shaft 5a provided at the rear of the crankshaft of internal combustion engine 5, via a damper 8.

Electrical motor 7 for control, which is made of a brushless DC motor, for example, is disposed coaxially with input shaft 12. Electrical motor 7 for control includes a stator 13 fixed to casing 29, and a rotor 15 rotatably supported at a slight spacing from stator 13. Rotor 15 is fixed to a sleeve (intermediate) shaft 15a fitted into input shaft 12 in a manner that allows relative rotation.

Mechanical-power-splitting planetary gear 9 has a carrier (first rotary element) CR1 coupled to input shaft 12 and supporting a plurality of pinion gears P1, a sun gear (second rotary element) S1 coupled to an output shaft of rotor 15, and a ring gear (third rotary element) R1 serving as an output portion for running. Ring gear R1 is coupled to an output shaft (drive shaft) 16 that extends rearward on the same axis line as that of input shaft 12.

A radius of mechanical-power-splitting planetary gear 9 measured from output shaft 16 is made smaller than a radius of electrical motor 7 for control measured from output shaft 16, electrical motor 7 for control being located closer to internal combustion engine 5 than mechanical-power-splitting planetary gear 9 is.

Electrical motor 10 for driving is formed of a brushless DC motor, and includes a stator core 17 fixed to casing 29, and a rotor 19 rotatably supported with an air gap formed on an inner diameter side of stator core 17. Rotor 19 is fixed to a sleeve (intermediate) shaft 31 fitted into output shaft 16 in a manner that allows relative rotation, and sleeve shaft 31 serves as an input shaft of transmission 30.

A radius of electrical motor 10 for driving measured from output shaft 16 is made larger than a radius of mechanical-power-splitting planetary gear 9 measured from output shaft 16, mechanical-power-splitting planetary gear 9 being located closer to internal combustion engine 5 than electrical motor 10 for driving is. In other words, between electrical motor 7 for control and electrical motor 10 for driving, there is disposed mechanical-power-splitting planetary gear 9 that has a radius smaller than a radius of each of the electrical motors.

Transmission 30 includes a pinion gear P2, and a sun gear S2 and a ring gear R2 that share pinion gear P2.

An output portion of transmission 30 is coupled to output shaft 16, and electrical motor 10 for driving is connected to output shaft 16 via transmission 30.

A radius of transmission 30 measured from output shaft 16 is made smaller than a radius of electrical motor 10 for driving measured from output shaft 16, electrical motor 10 for driving being located more adjacently to internal combustion engine 5 than transmission 30 is.

Here, capacitor C2 shown in FIG. 2 as well is disposed on an outer peripheral side of mechanical-power-splitting planetary gear 9.

A radius of mechanical-power-splitting planetary gear 9 is made smaller than a radius of each of adjacent electrical motor 7 for control and electrical motor 10 for driving. Accordingly, as to casing 29 that smoothly covers electrical motor 7 for control and electrical motor 10 for driving in a contiguous manner, a portion of an inner surface of casing 29 where mechanical-power-splitting planetary gear 9 is located, is spaced apart from mechanical-power-splitting planetary gear 9.

Therefore, by disposing an electrical apparatus of vehicle drive mechanism 200, such as capacitor C2, on the outer peripheral side of mechanical-power-splitting planetary gear 9 and between mechanical-power-splitting planetary gear 9 and the inner surface of casing 29, a space in casing 29 can effectively be used.

By disposing a part of electrical apparatuses (elements) that form semiconductor module 110, namely, capacitor C2, in hybrid drive device 6, other electrical apparatuses that form semiconductor module 110, namely, inverters 114, 131, switching elements Q1, Q2, diodes D1, D2, and others are accommodated in PCU casing 60. Therefore, PCU casing 60 shown in FIG. 1 can be downsized, and thus a ratio at which PCU casing 60 occupies the engine room becomes low, so that the space in the engine room can effectively be used for another purpose.

In the present embodiment, a radius of mechanical-power-splitting planetary gear 9 is made smaller than a radius of each of adjacent electrical motor 7 for control and electrical motor 10 for driving, and an electrical apparatus such as capacitor C2 is disposed on the outer peripheral side of mechanical-power-splitting planetary gear 9. However, it is noted that the configuration is not limited thereto.

If mechanical-power-splitting planetary gear 9 is formed to have a radius smaller than a radius of at least one of adjacent electrical motor 7 for control and electrical motor 10 for driving, a gap is formed between mechanical-power-splitting planetary gear 9 and casing 29. In this case as well, it is possible to dispose an electrical apparatus such as capacitor C2 on the outer peripheral side of mechanical-power-splitting planetary gear 9.

In the present embodiment, capacitor C2 is disposed on the outer peripheral side of mechanical-power-splitting planetary gear 9. However, the configuration is not limited thereto. Capacitor C2 may be disposed on an outer peripheral side of one of mechanical-power-splitting planetary gear 9, electrical motor 7 for control, electrical motor 10 for driving, and transmission 30, the one having a radius smaller than a radius of at least one of the others.

Figure 4:
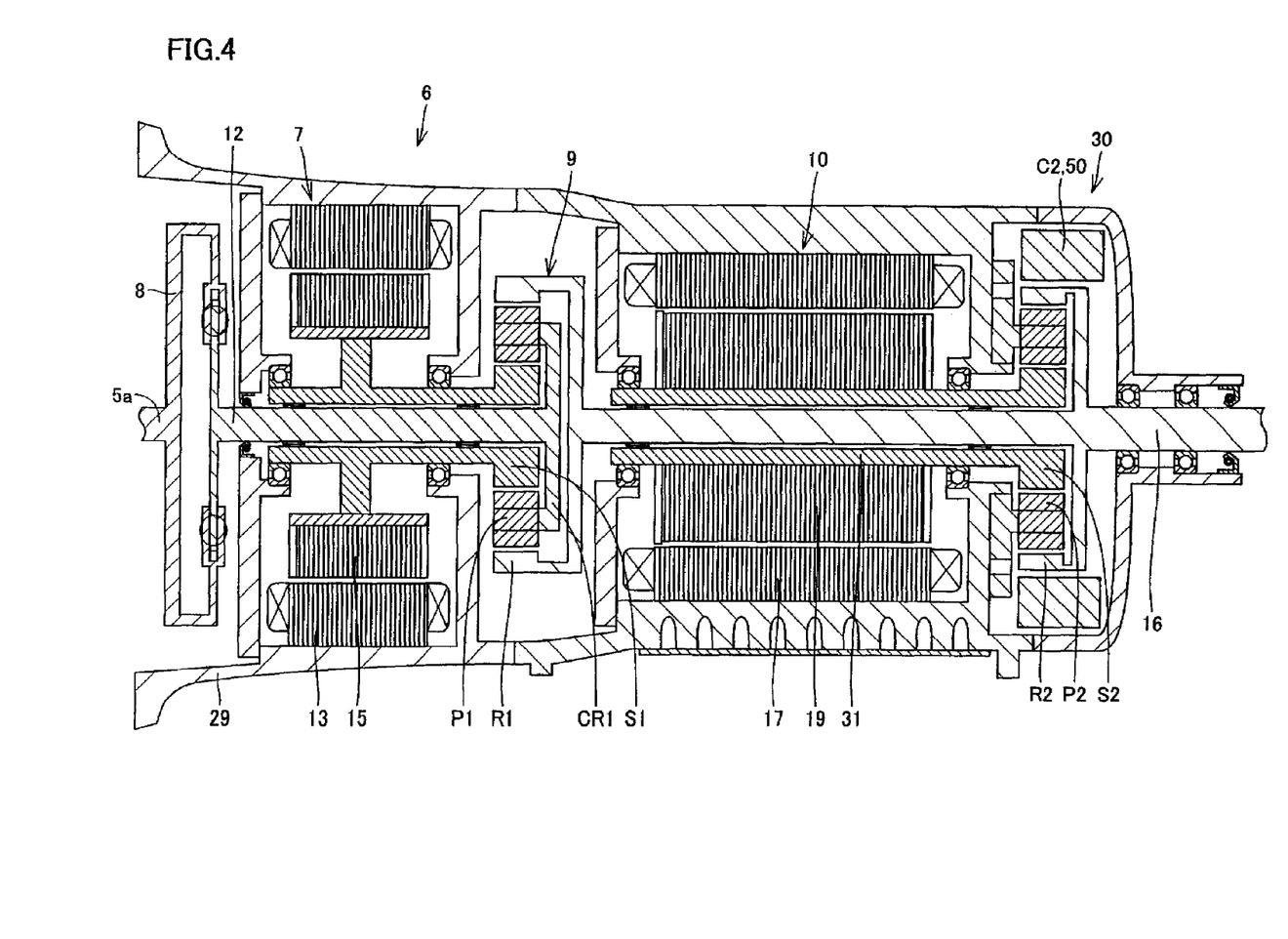
FIG. 4 is a cross-sectional view of a hybrid drive device of a vehicle drive mechanism according to a first modification of the present embodiment.

FIG. 4 is a cross-sectional view of hybrid drive device 6 of vehicle drive mechanism 200 according to a first modification of the present embodiment. As shown in FIG. 4, capacitor C2 may be disposed on an outer peripheral side of transmission 30, which is formed to have a radius smaller than a radius of adjacent electrical motor 10 for driving.

Figure 5:
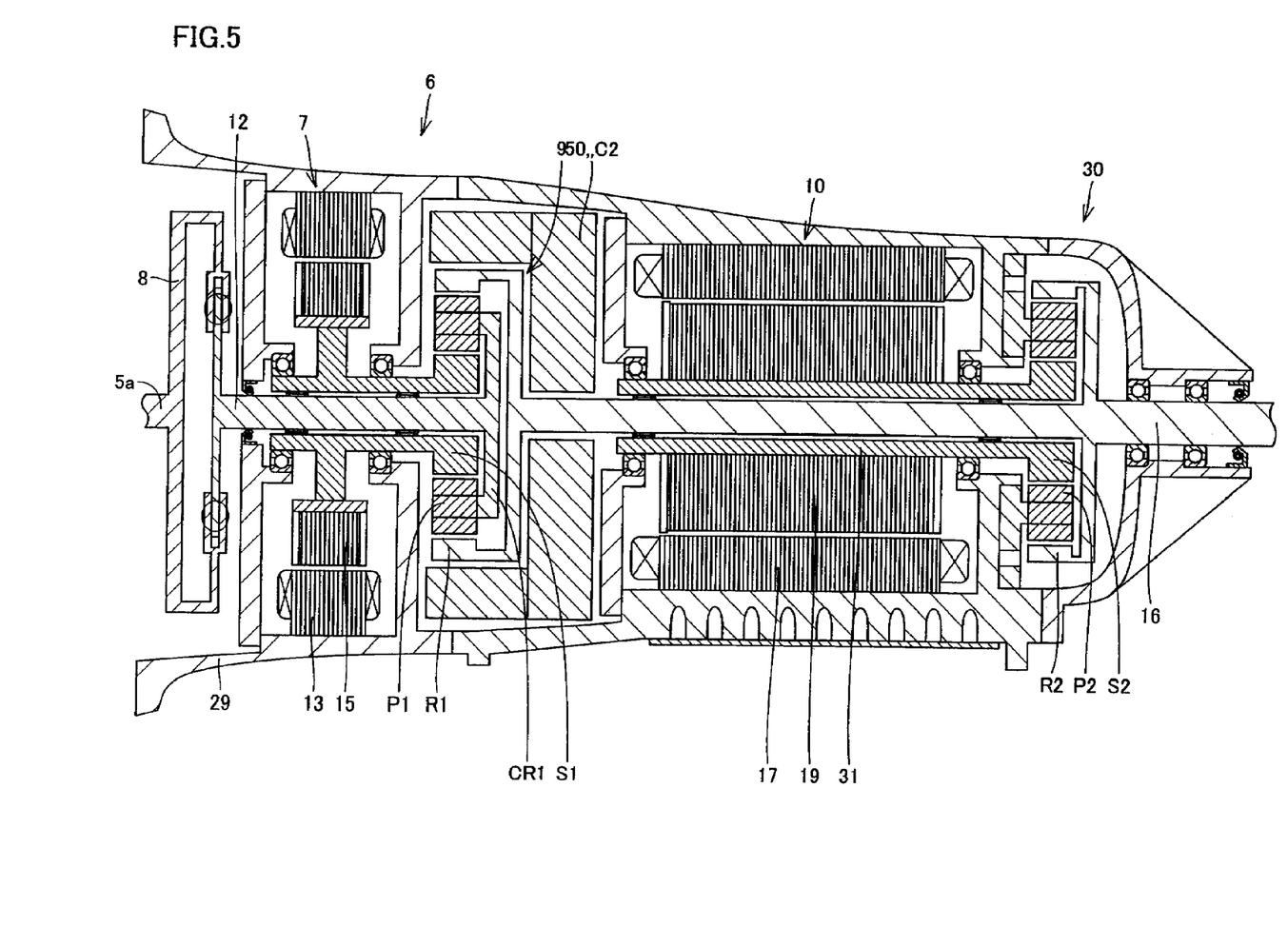
FIG. 5 is a cross-sectional view of a hybrid drive device of a vehicle drive mechanism according to a second modification of the present embodiment.

FIG. 5 is a cross-sectional view of hybrid drive device 6 of vehicle drive mechanism 200 according to a second modification of the present embodiment. In hybrid drive device 6 shown in FIG. 5, an axial length of each of rotor 15 and stator 13 in electrical motor 7 for control is reduced, so that a part of output shaft 16 is embedded into the accommodation chamber where mechanical-power-splitting planetary gear 9 is located. In the accommodation chamber where mechanical-power-splitting planetary gear 9 is located, capacitor C2 is disposed in a region covering a periphery of output shaft 16 and located on the outer peripheral surface side of mechanical-power-splitting planetary gear 9. With this modification, it is possible to ensure a large space for accommodating capacitor C2, and to ensure that capacitor C2 has a large volume.

Further, in the present embodiment, capacitor C2 is disposed on the outer peripheral side of mechanical-power-splitting planetary gear 9. However, another electrical apparatus such as reactor L1 may be disposed. It is noted that if an electrical apparatus such as capacitor C2 is disposed between the inner peripheral surface of casing 29 and the outer peripheral surface of mechanical-power-splitting planetary gear 9 or the like, as described above, an outer peripheral surface of capacitor C2 is preferably deformed to conform to the inner peripheral surface of casing 29. By forming capacitor C2 as such, capacitor C2 can favorably be embedded into a gap, and gap utilization efficiency can be improved.

Figure 6:
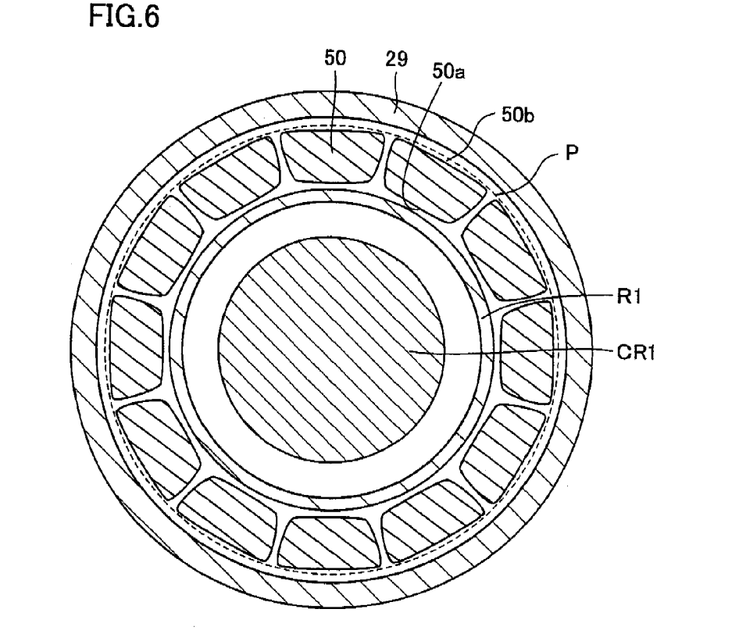
FIG. 6 is a cross-sectional view taken along a line VI-VI in FIG. 3.

FIG. 6 is a cross-sectional view taken along a line VI-VI in FIG. 3. As shown in FIG. 6, capacitor C2 is constituted by a plurality of cell capacitors 50, which are connected in parallel.

Each of cell capacitors 50 is disposed along a virtual circle P concentric with output shaft 16 shown in FIG. 3. Therefore, it is possible to dispose each of cell capacitors 50 along the outer peripheral surface of mechanical-power-splitting planetary gear 9, reduce a gap between mechanical-power-splitting planetary gear 9 and cell capacitors 50, and more effectively use the space outside mechanical-power-splitting planetary gear 9.

Further, a length of an inner peripheral surface 50a of each of cell capacitors 50 in a circumferential direction of output shaft 16 is made smaller than a length of an outer peripheral surface 50b in the circumferential direction of output shaft 16, so that a cross-sectional shape is made to be approximately trapezoidal or approximately triangular.

By forming each of cell capacitors 50 as such, it is possible to further reduce a gap between cell capacitors 50, further improve utilization efficiency of a gap between mechanical-power-splitting planetary gear 9 and casing 29, and increase a capacitance of large capacitor C2.

Figure 7:
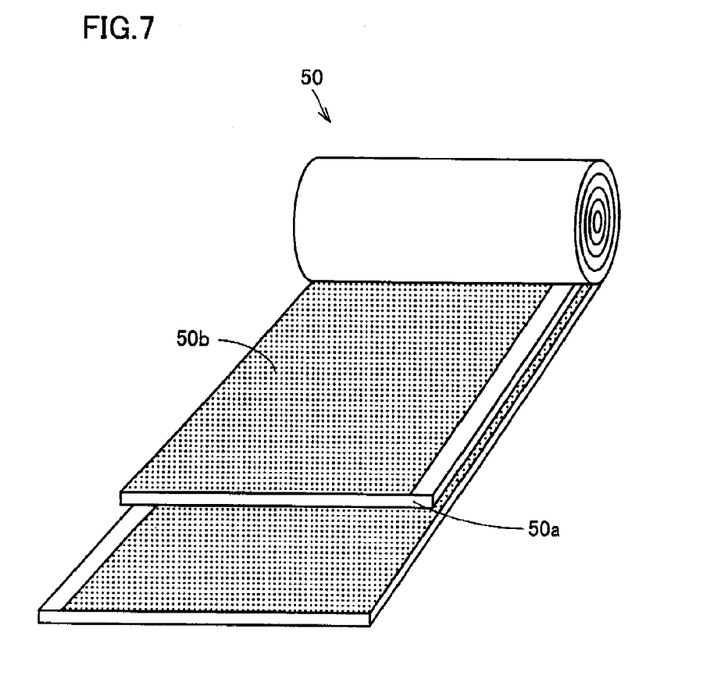
FIG. 7 is a perspective view of a cell capacitor with its part shown in an exploded manner.

FIG. 7 is a perspective view of cell capacitor 50 with its part shown in an exploded manner. As shown in FIG. 7, cell capacitor 50 is made of, for example, a film capacitor or the like, and has a film 50a identified as a dielectric, and an electrode 50b formed by evaporating metal onto a surface of film 50a under vacuum. Film 50a on which electrode 50b is formed is rolled up to form cell capacitor 50.

Generally, film 50a is formed of a low-loss polypropylene film (PP film), and aluminum or an aluminum-zinc composite is used as the metal to be evaporated.

In order to allow a cross-sectional shape of cell capacitor 50 to be approximately trapezoidal, the film rolled up into a cylindrical shape is squeezed into a trapezoidal shape or the like.

It is noted that a material of the cell capacitor 50 is not limited to such a film capacitor, and a stacked capacitor may also be used to constitute cell capacitor 50.

Figure 8:
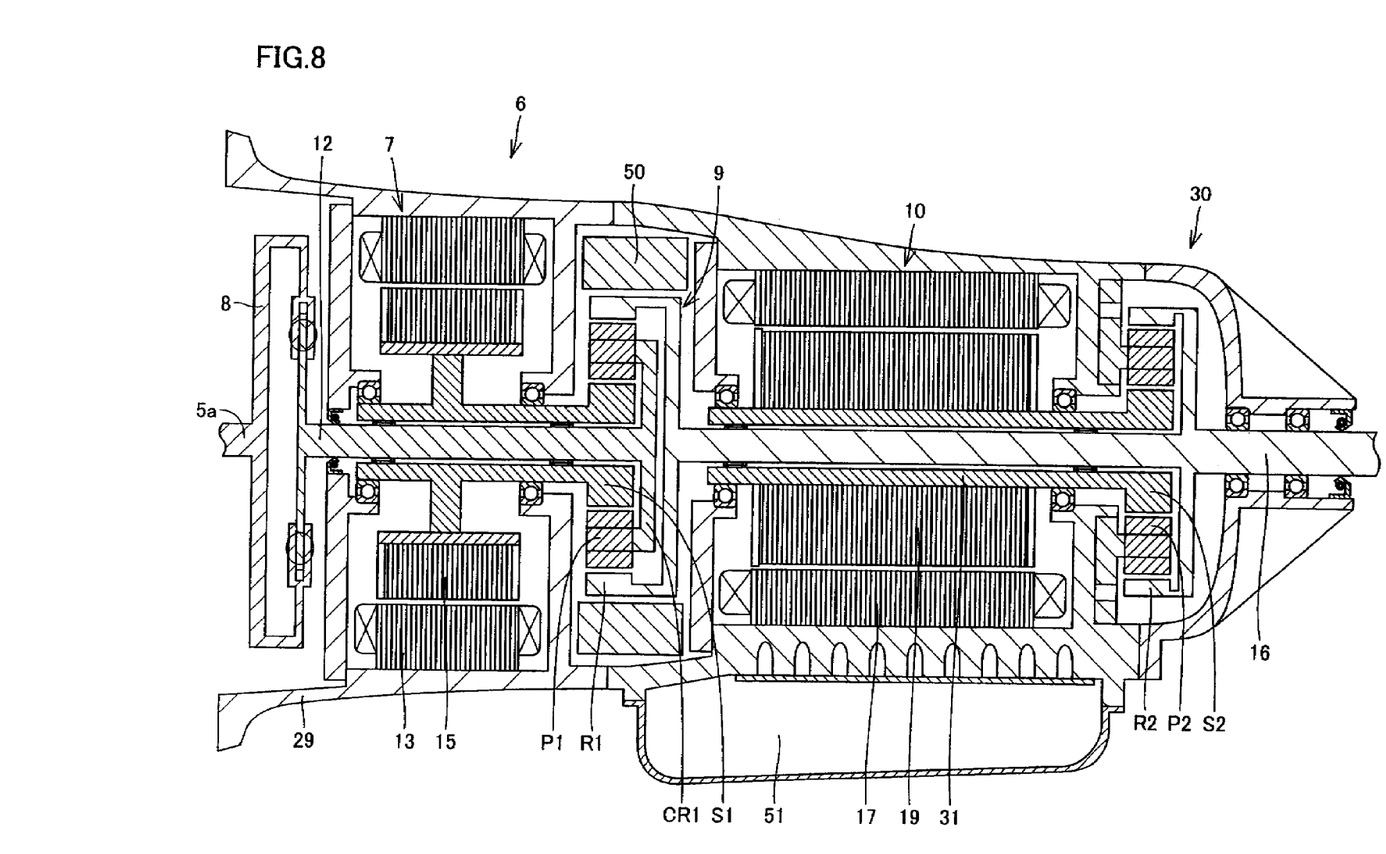
FIG. 8 is a cross-sectional view of a hybrid drive device of a vehicle drive mechanism according to a third modification of the present embodiment.

FIG. 8 is a cross-sectional view of hybrid drive device 6 of vehicle drive mechanism 200 according to a third modification of the present embodiment. As shown in FIG. 8, casing 29 that accommodates hybrid drive device 6 further includes an accommodation portion 51 for accommodating inverters 114, 131 shown in FIG. 2, on its underside.

It is thereby possible to reduce the number of electrical apparatuses to be accommodated in PCU casing 60 shown in FIG. 1, and further downsize PCU casing 60. In association with this, it is possible to lower the ratio at which PCU casing 60 occupies the engine room, and furthermore, effectively utilize the space in the engine room for another purpose.

Accommodation portion 51 is located on the underside of casing 29, and hence reduction in space of a passenger compartment located above hybrid drive device 6 is prevented.

Figure 9:
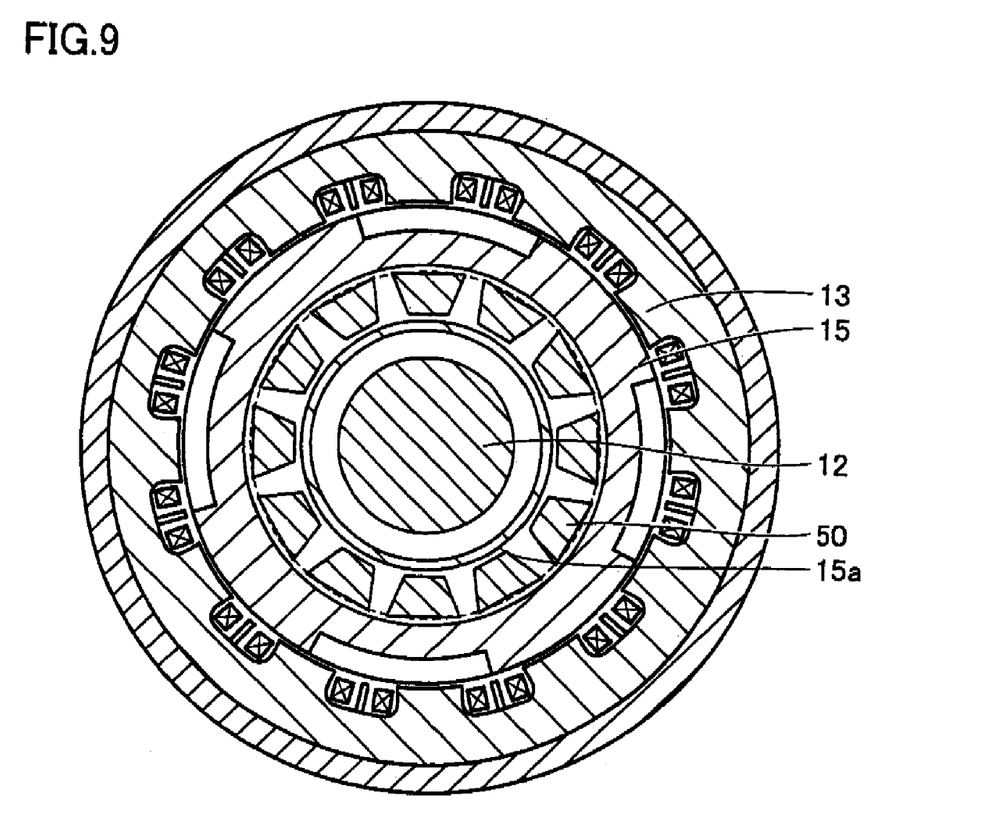
FIG. 9 is a cross-sectional view of a hybrid drive device of a vehicle drive mechanism, showing a fourth modification of the present embodiment.

FIG. 9 is a cross-sectional view of hybrid drive device 6 of vehicle drive mechanism 200, showing a fourth modification of the present embodiment.

As shown in FIG. 9, cell capacitors 50 of capacitor C2 may annularly be disposed between a sleeve shaft 15a of electrical motor 7 for control and rotor 15, with input shaft 12 (output shaft 16) set as the center.

In other words, at least a part of electrical apparatuses that form semiconductor module 110 is disposed not only in a gap between casing 29 and an outer peripheral portion of electrical motor 7 for control and the like, but also in a gap formed in hybrid drive device 6, to reduce a volume of PCU casing 60.

As described above, the embodiment of the present invention has been described. However, it should be understood that the embodiment disclosed herein is illustrative and not limitative in all aspects. The scope of the present invention is shown by the scope of the claims, and is intended to include all modifications within the equivalent meaning and scope of the claims.

INDUSTRIAL APPLICABILITY

The present invention is suitable for a vehicle drive mechanism of a hybrid vehicle, including a power transmission mechanism that has a rotary electric motor and a gear mechanism for transmitting mechanical power from the rotary electric motor, and a power control unit for controlling a driven state of the power transmission mechanism.

The invention claimed is:

1. A vehicle drive mechanism comprising:
a power transmission mechanism which has a rotary electric motor, and a gear mechanism for transmitting mechanical power from said rotary electric motor to a drive shaft disposed coaxially with an output shaft of said rotary electric motor; and
a control unit formed of a plurality of elements and controlling an operation of said rotary electric motor,
wherein at least a part of said elements which form said control unit is disposed on a periphery of at least one of said rotary electric motor, said drive shaft, and said gear mechanism, and
at least a part of said elements which form said control unit is provided on an outer periphery of one of said gear mechanism and said rotary electric motor, a radius of the one of said gear mechanism and said rotary electric motor measured from said drive shaft being smaller than a radius of the other of said gear mechanism and said rotary electric motor measured from said drive shaft,
wherein the elements which form said control unit include a capacitor having a plurality of cells, each of said cells having an inner peripheral surface and an outer peripheral surface, and
wherein a length of said outer peripheral surface in a circumferential direction of said drive shaft is made larger than a length of said inner peripheral surface in the circumferential direction of said drive shaft.

2. The vehicle drive mechanism according to claim 1, wherein the elements which form said control unit are disposed along a virtual circle concentric with said drive shaft.

3. The vehicle drive mechanism according to claim 1, comprising a plurality of said rotary electric motors,
wherein said gear mechanism which has a radius smaller than a radius of at least one of said rotary electric motors is disposed between said rotary electric motors, and
said capacitor is disposed on an outer peripheral side of said gear mechanism.

4. The vehicle drive mechanism according to claim 1, further comprising an enclosure for accommodating said power transmission mechanism, wherein
the elements which form said control unit include an inverter, and
said inverter is provided in said enclosure.

5. The vehicle drive mechanism according to claim 4, wherein said inverter is provided on an underside of said power transmission mechanism.

6. The vehicle drive mechanism according to claim 1, wherein said power transmission mechanism drives a rear wheel.

* * * * *